Figure 1:
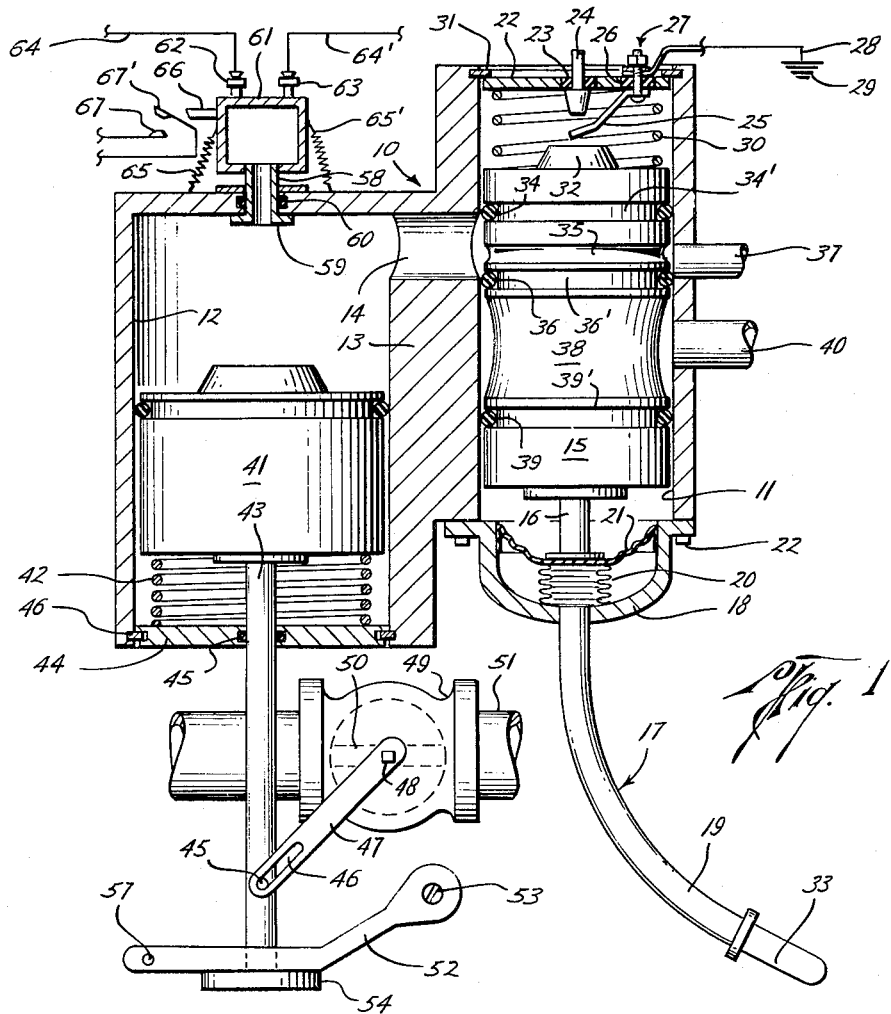

Aug. 15, 1961

J. MAHAND ET AL 2,996,079

FLUID OPERABLE DEVICE FOR CONTROLLING ENGINES AND THE LIKE

Filed April 21, 1958

Jack Mahand
Leon L. Bailey
INVENTORS

BY Wm. E. Ford

ATTORNEY 2,996,079
Patented Aug. 15, 1961

2,996,079
FLUID OPERABLE DEVICE FOR CONTROLLING ENGINES AND THE LIKE
Jack Mahand, 5706 Ridgeway, Houston, Tex., and Leon L. Bailey, Rte. 4, Robstown, Tex.
Filed Apr. 21, 1958, Ser. No. 729,955
1 Claim. (Cl. 137—620)

This invention relates to fluid operable devices for controlling engines and the like in which a master cylinder-piston unit operates responsive to change in a physical property or condition, as temperature, to carry out control functions and also to employ a means supplied by the medium it controls, as a pressurized fluid supplied by an internal combustion engine, and so controls the delivery of such means to a second or follower cylinder-piston unit, as to actuate said follower unit to carry out control functions associated therewith.

As an application of this invention, a conventional internal combustion engine may have a first or control cylinder-piston unit actuated by a thermostat located as in the engine coolant line under conditions whereby at normal coolant temperatures the magneto circuit of the engine remains closed, the valve in the fuel line or in the combustion air line is held open, a signal system signifying the normal functioning of the engine, as green or running light, remains on. However if the coolant heats up responsive to the engine running dangerously hot, the thermostat fluid may expand to urge a bellows, diaphragm, or a combination thereof to urge the control unit cylinder to move to ground out the magneto circuit and into position to cut off the supply of lubricating oil from the engine lubricating system past the first unit piston and into the second unit cylinder to actuate means therein including the second unit piston to close the valve controlling the fuel or combustion air line, break the normal signal circuit, and close a warning signal circuit as to a red light, a warning bell, or a siren.

Having stated generally the type of invention involved, and described in general an application thereof, it can be stated that the primary object of the invention is to provide a fluid operable device having a first or control means therein actuated responsive to change in a physical property or condition to itself actuate functions of the means or medium it controls and also to regulate the action of a force supplied by such means or medium into a second or follower means whereby such follower means may act upon functions of such controlled means or medium.

It is a further object of this invention to provide a fluid operable device for controlling internal combustion engines and the like whereby a control cylinder-piston is motivated responsive to change of physical property or condition, as temperature, so that it may act itself on a function of the engine or the like, and also so that it acts to change the action of say an engine developed force supplied through the control cylinder-piston unit to a second or follower cylinder-piston unit with resultant change in other functions associated with, or attendant upon the operation of the engine and the like.

It is yet another object of this invention to employ a minimum structure in the form of two cylinder-piston units arranged in tandem to control a maximum number of functions, or functions associated with, the device controlled, as an engine.

Figure 2:
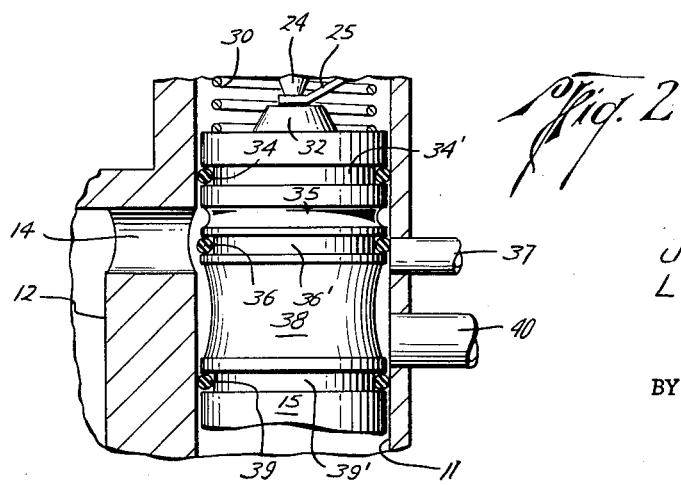

Other and further objects will be apparent when the specification herein is considered in connection with the accompanying drawings in which:

FIG. 1 is a view, part in section, and partially diagrammatic, showing one embodiment of the invention; and FIG. 2 is a fragmentary view, also part in section, and partially diagrammatic, showing a development in the operation of the right hand piston shown in FIG. 1.

Referring in detail to the drawings, a control device 10 is shown in FIG. 1 in which two bores are provided in a metal block 13 to form two adjacent cylinders 11 and 12 arranged in tandem or echelon with a performance conduit or communication part 14 being provided therebetween. Optionally the cylinders may be separated and the interconnecting conduit 14 may be in the form of a tubing, hose, or the like.

The cylinder 11 which may be termed the first or control cylinder, has a piston 15 therein to which a rod 16 may be threadably connected. Such rod is part of a thermostat assembly 17 and includes a cap 18 to which a thermostat 19 is connected having an expansible liquid therein. A bellows 20 is fixed within the cap 18 to communicate with the interior of the thermostat 19, with a diaphragm 21 to which the piston rod 16 is connected, forming the inner closure of the bellows 20, such diaphragm being connected peripherally to the inner surface of the cap 18. Optionally the bellows alone may be provided for connection to the piston rod 16, or optionally the diaphragm 21 alone may be provided for connection to the piston rod, in which case the expanded liquid from the thermostat would enter into the cap and wet upon the bellows. Under whatever conditions of construction may be chosen, the piston rod 16 is connected to the piston 15 and the cap 18 is connected to the metal block 13 as by capscrews 22 to form the closure for the piston rod end of the cylinder 11.

At the opposite end of the cylinder 11 a closure plate 22 is provided having an insulative bushing 23 therein through which protrudes an electrical conductor 24 which is extended for connection into the magneto circuit of a conventional internal combustion engine. A contact spring 25 is also carried by the closure plate 22, such spring being connected to the inner face of an insulative bushing 26 therein by means of a conventional nut, bolt, and lock washer unit 27 which also connects an electical conductor 28 to the outer face of the insulative bushing 26, such conductor 28 being grounded as indicated at 29. The closure plate 22 confines a spring 30 within the cylinder 11 to bear upon the end of the piston 15 adjacent thereto, while a conventional snap ring 31 retains the closure plate.

Adjacent the contact spring 25 the piston head is reduced to a frusto-conical part 32, which should be of an insulative material in case the piston 15 itself is not insulated. As shown in FIG. 1 the coolant in which the bulb 33 of the thermostat 19 is immersed is at normal operating temperature, and under such conditions the piston 15 has therein successively spaced from the head 32, first a groove 34' to receive an O-ring 34 therein shown sealing with the cylinder bore 11 at the top of the performance conduit 14 to close off fluid from the upper end of the cylinder bore 11. Spaced from the O-ring 34 a narrow groove 35 is provided in the periphery of the cylinder, and slightly spaced from the groove 35 a groove 36' is provided to receive an O-ring 36 therein. Such O-ring is shown sealing with the piston bore 11 and at the lower side of a pressurized fluid inlet 37 through which a pressurized fluid, as the engine lubricating oil, may be supplied into the cylinder 11.

Spaced from the groove 36' a groove 38, substantially wider than the groove 35, is provided in the periphery of the piston 15, and slightly spaced from the wide groove 37 a groove 39' is provided to receive an O-ring 39 therein, which is shown sealing with the cylinder bore 11 and with the lower side of a fluid discharge 40 which leads to the lubricating oil sump of the engine.

In operation, with the temperature of the coolant at normal temperature, the inlet 37 has full communication, via the conduit 14, with the second or follower cylinder 12, and acts therein as will be explained hereinbelow. However as the liquid or fluid of the thermostat 19 expands responsive to increase of heat in the coolant, the bellows 20 urges against the diaphragm 21 and piston rod 16 to force the piston 15 upwardly and the passage of fluid from the inlet 37 via the narrow groove 35 to the conduit 15 is restricted, and then a certain amount of fluid from the inlet 37 is by-passed through the wide groove 38, also a certain limited communication is established between the conduit 14 and the wide groove 38. Thereafter, as the temperature may continue to increase, a condition as shown in FIG. 2 is reached in which all of the fluid from the inlet 37 discharges into the wide groove 38 and at the same time the conduit 14 is in fuller communication with said wide groove.

The pressurized fluid which at normal temperature enters the cylinder 12 from the inlet 37 by way of the narrow groove 35 and the performance conduit 14, urges a cylinder 41 downwardly against a spring 42 surrounding the rod 43 of such piston. Such rod 43 passes through a closure plate 44 and a seal ring 45 therein, the plate 44 being restrained in position by a snap ring 46, as shown. The piston 41 has a groove 55 therein to receive O-ring 56 to seal off the lower end of the cylinder 12 from the upper, fluid receiving part.

The rod 43 has a transversely extending pin 45 thereon externally of the cylinder 12 and such pin extends slidably into a slot 46 in one end of a lever 47, the other end of which fits at 48, on the outward, non-circular part of a pin which is journalled in opposite sides of the wall of a valve 49. Such pin 48 has the valve element 50 mounted thereon within the valve to control the flow passage therethrough from the line 51, which may be the fuel line of the engine, or the combustion air line which supplies the air which is mixed with the engine fuel to support combustion thereof.

For cases where the engine is stopped and has to be primed to start, a lever 52 is provided pivoted at 53 which is adapted to act against a flange or head 54 to urge the piston rod 43 and piston 41 outwardly in opposition to the force of the spring 42 in cases when there is no support of pressure fluid within the cylinder 12 to urge the piston 41 outwardly. A pin 57 is indicated to be inserted into a hole in the lever 52, and into any other stationary receptacle to hold the lever 52 locking the valve 51 open.

At the upper end of the cylinder 12 a hollow, insulative plunger rod 58 is provided having a stop flange 59 on the inner end thereof, such plunger rod 58 extending through a seal ring 60 in the end of the cylinder 12 opposite the closure plate 44. A hollow metallic plunger 61 is threadably connected to the outer end of the plunger rod 58 and such plunger has contacts 62, 63 on the outer end thereof to close a circuit 64, 64' having a signal therein, as a green light, to designate the normal functioning of the engine.

For cases when the fluid pressure in the cylinder 12 falls off, as when the temperature of the coolant rises excessively, to position the piston 15 so that the fluid from the cylinder may at least in part return via performance conduit 14 and wide groove 38 to the sump discharge 40, springs 65, 65' are provided to urge the plunger 61 inwardly, and for such occasion an insulative arm 66 is provided and attached to the plunger to close contacts 67, 67' in a second signal circuit which may have a warning means therein set operative when the contacts 67, 67' are closed, and such warning means can be a flashing red light, a buzzer, or a siren and the like.

The structure of an embodiment of the invention having been described hereinabove, and the inter-relationship of its component elements having been set forth, consideration may be given to the various adaptations and usages to which the invention may be applied. For instance the piston rod 43 may be connected at normal temperatures to hold closed an air conditioning system as a cold air duct and thus such duct would be opened responsive to an increase in temperature.

Also, the plunger controlled circuits 64, 64' and 67, 67' need not include signal indicia but could include an auxiliary machine circuit 64, 64' to be brought in when the engine ran normally, and another auxiliary machine circuit 67, 67' to be brought in when the engine had stopped.

Also the piston 15, when urged upwardly to the fullest travel, could close circuit to a standby engine rather than ground out the engine having the overheated coolant, as in any event such engine would be brought to a stop by the closure of the valve element 50.

Additionally the thermostat could be replaced by a vacuum line, as a line connected to an intake manifold and connections made to functions that should be shut down upon failure of vacuum. Reversely, a pressure responsive device could replace the thermostat and connections made to effect shut-down upon an excessive pressure being achieved. As a matter of fact it can be visualized how the thermostat could be replaced by means responsive to change in almost any physical property or condition, and connections made that the piston 15 would be moved upwardly upon departure of such physical property or condition from a predetermined norm, base of reference, or absolute.

Broadly, then, the invention is not limited to the embodiment hereinabove described and disclosed in the references but a wide variety of embodiments, modifications, adaptations, and variations are considered as well, both in regard to structures, in regard to functions, and in regard to usages and applications thereof, as long as such may fall within the broad spirit of the invention and within the broad scope of interpretation claimed and merited for the appended claim.

What is claimed is:

A servo-motor actuated valve operable responsive to temperature change including a cylinder having a piston therein and a thermostat in an end thereof with expansible fluid therein to urge said piston responsive to temperature increase and a spring therein urging such piston in opposition to the thermostat fluid, said cylinder also having a pressurized fluid inlet and an adjacent discharge outlet in the wall thereof, a performance conduit communicating with said cylinder and through which fluid from said cylinder is discharged as pressure fluid, the piston of said unit having adjacent narrow and wide peripheral grooves therein isolated by seal means sealing with the cylinder bore and said piston being positionable at normal temperature to establish fluid communication between said wide groove and said discharge outlet and from said inlet via said narrow groove to said performance conduit, upon increase of temperature said thermostat fluid urging said piston to establish fluid communication between said wide groove and said performance conduit and to restrict communication of inlet fluid with said narrow groove and said performance conduit and to by-pass inlet fluid via said wide groove to said discharge outlet, and upon further increase of temperatures said piston being urged to close communication of inlet fluid with said narrow groove while increasing communication between said wide groove and said performance conduit and increasing the by-passing of inlet fluid via said wide groove to said discharge outlet, the fluid pressure in said performance conduit decreasing upon reduction of fluid communication between said inlet via said narrow groove to said performance conduit and upon the consequent increase of fluid communication between said performance conduit and said wide groove.

References Cited in the file of this patent

UNITED STATES PATENTS

| | | |
|---|---|---|
| 1,143,346 | Baird et al. | June 15, 1915 |
| 2,201,123 | Davis | May 14, 1940 |
| 2,428,531 | Schorn | Oct. 7, 1947 |
| 2,731,001 | Dickson et al. | Jan. 17, 1956 |
| 2,840,064 | Hofer | June 24, 1958 |